No. 881,470. PATENTED MAR. 10, 1908.
C. HARKNESS.
TROLLEY.
APPLICATION FILED NOV. 28, 1906.
3 SHEETS—SHEET 1.
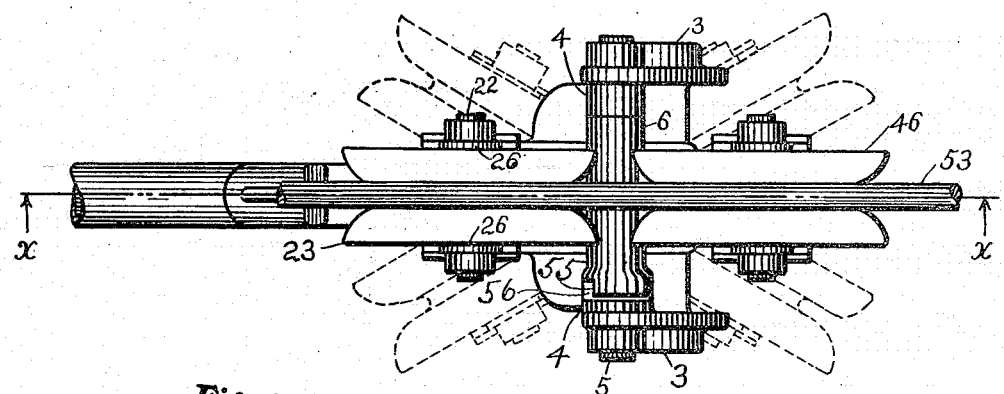
Fig. 2.
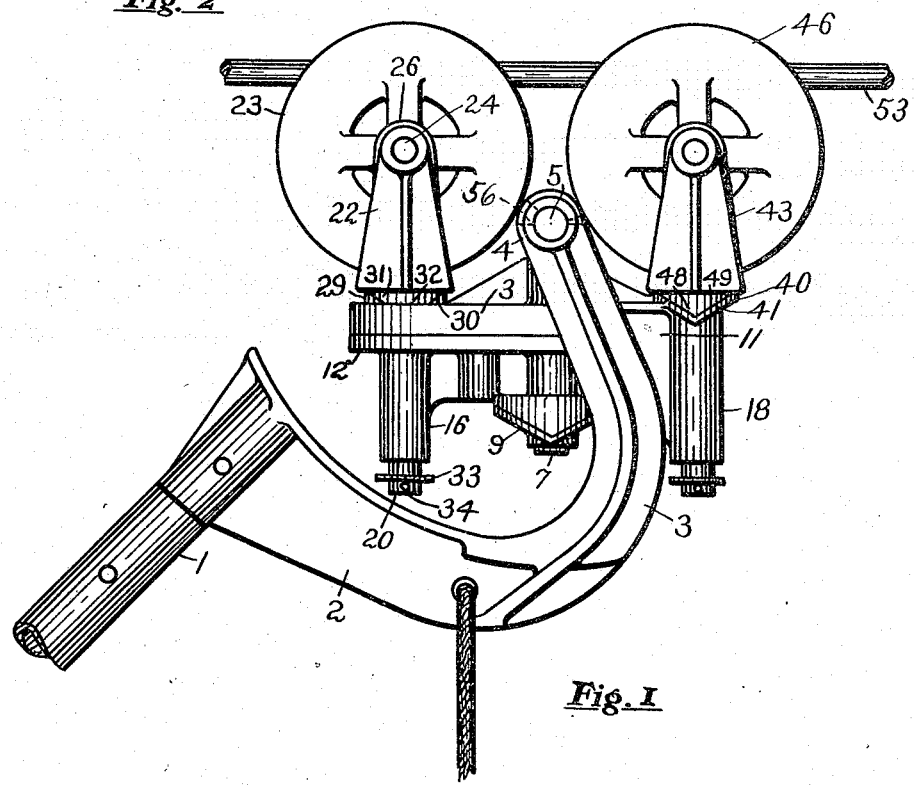
Fig. I.
Witnesses.
A. H. Whatley.
Inventor.
Charles Harkness
By Horatio E Bellows
Attorney.

No. 881,470. PATENTED MAR. 10, 1908.
C. HARKNESS.
TROLLEY.
APPLICATION FILED NOV. 28, 1906.

3 SHEETS—SHEET 2.

Witnesses.
A. H. Whatley.

Inventor,
Charles Harkness
By Horatio E. Bellows
Attorney.

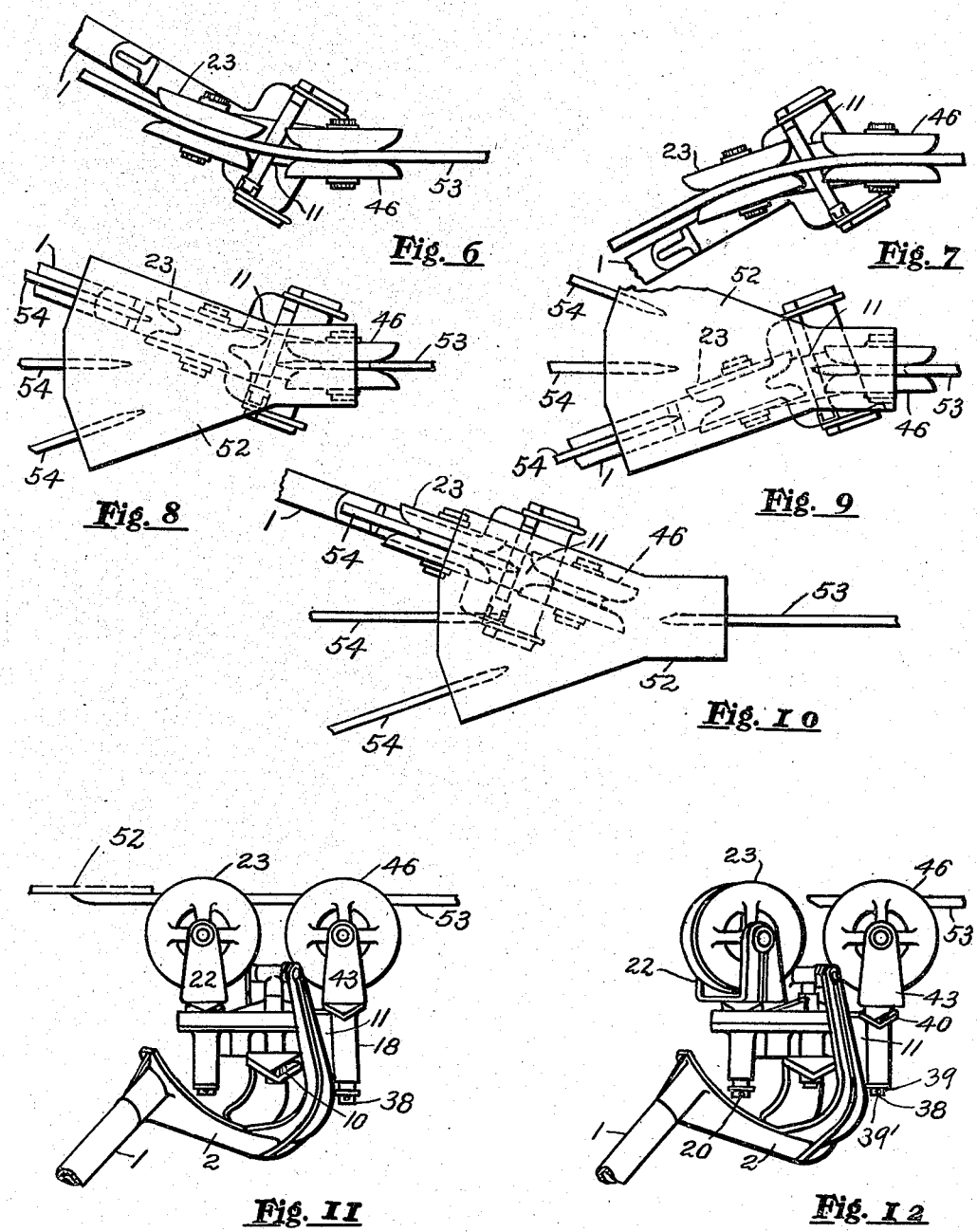

UNITED STATES PATENT OFFICE.

CHARLES HARKNESS, OF PROVIDENCE, RHODE ISLAND, ASSIGNOR, BY MESNE ASSIGNMENTS, TO THE UNITED TRACTION IMPROVEMENT COMPANY, A CORPORATION OF RHODE ISLAND.

TROLLEY.

No. 881,470.  Specification of Letters Patent.  Patented March 10, 1908.

Application filed November 28, 1906. Serial No. 345,469.

*To all whom it may concern:*

Be it known that I, CHARLES HARKNESS, a citizen of the United States, residing at Providence, in the county of Providence and State of Rhode Island, have invented certain new and useful Improvements in Trolleys, of which the following is a specification, reference being had therein to the accompanying drawing.

My invention relates to trolleys, and its essential objects are to prevent accidental displacement of the trolley wheel from the conductor under all conditions, whether passing on a level, on a curve, or on a switch; and to provide a trolley wheel structure which shall of itself perform the essential function heretofore sought by an auxiliary trolley guard or conductor engaging device.

It is known that an irregularity of the conductor combined with the swaying of the car will disengage a trolley wheel moving on a level or otherwise. My experiments have shown that two trolley wheels may be made to coact to mutually maintain each other in contact with the conductor, when moving on a level, by mounting the couplet to tilt or rock vertically; and when moving on a curve, by affording a pivotal action to the individual wheels; and when traversing a switch at any speed, by imparting to the leading wheel the direction of the pole. To further insure the continuous contact of the wheels with the suspended parts while traversing a switch, the wheels should have a capacity for vertical movement. To the successful operation of the double wheel trolley under all conditions, it is essential that the pivoted frame or other supporting device of the trolley wheels should at all times be horizontal to the plane of the conductor, and should be capable of transverse movement independent of the position of the trolley pole.

Figure 3:
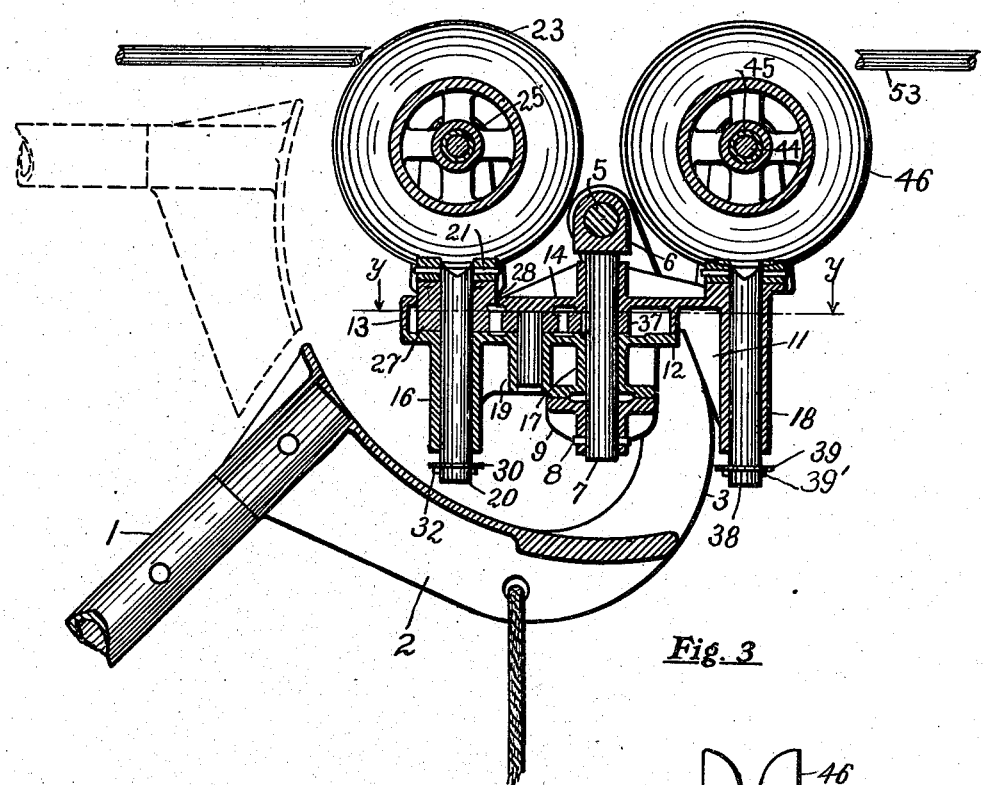
Figure 4:
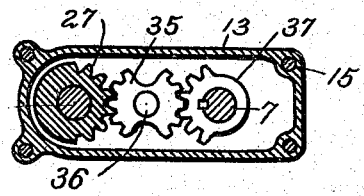
Figure 5:
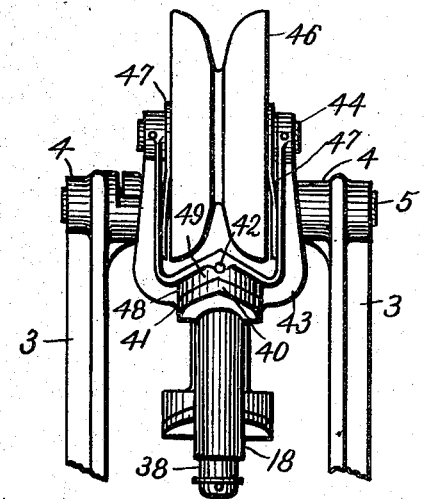

To the ends above set forth, my invention consists in the features and in the construction, combination, and arrangement of parts hereinafter described, and particularly pointed out in the claims, reference being had to the accompanying drawings forming a part of this specification, wherein, Figure 1 is a side elevation of my new trolley. Fig. 2, a plan of the same, showing in broken lines some of the positions assumed by the truck when the car is at an angle with the conductor. Fig. 3, a section of the same on line $x$ $x$ of Fig. 2, showing in broken lines a possible position of the pole relative to the trolley mechanism. Fig. 4, a section on line $y$ $y$ of Fig. 3. Fig. 5, a rear view of the upper portion of the trolley device. Figs. 6 and 7, top plan views of the trolley device showing the positions of the wheels in passing a curve. Figs. 8, 9 and 10, top plan views of a switch and trolley showing different positions of the wheels while traversing the switch, and Figs. 11 and 12, perspective views of the trolley device.

Like reference characters indicate like parts throughout the views.

My trolley comprises a pole, 1, to which is fixed a rearwardly and upwardly directed fork, 2, of nearly semi-circular outline comprising two arms, 3, 3, in whose extremities are bearings, 4, 4, in which is loosely mounted a pintle, 5, fixed in a sleeve, 6, intermediate the bearings, 4. Integral with or fixed to the sleeve is a vertical spindle, 7, to whose lower end is fixed by a pin, 8, or otherwise, a cam plate, 9, having upon its upper face two longitudinally disposed V-shaped projections and depressions, 10, forming an angular seat. Supported by the sleeve, 6, spindle, 7, and plate, 9, is the suspension frame for carrying the trolley wheels indicated in a general way by 11.

The frame may be of any form of construction suitable for carrying the general details of mechanism, and may consist of a single piece. In the form thereof herein shown it comprises two pieces, namely an oblong base-plate, 12, upon which the marginal flange, 13, of a top plate, 14, is fixed by screws, 15, or in any convenient manner, and projects rearwardly from and in alinement with the base-plate. The frame, 11, is provided upon its forward, central and rear portions respectively with vertical tubular bearings or hubs, 16, 17 and 18, in longitudinal alinement with each other. A similar but shorter bearing, 19, is located in the truck intermediate and in alinement with the bearings, 16 and 17. Loosely mounted in the bearing, 16, and projecting some distance below the end of the same is the fork-stem, 20, to whose top is fixed by transverse pin, 21, or otherwise the fork, 22. The fork may be made integral with the spindle, if preferred.

The forward trolley wheel, 23, is revolubly mounted upon the pintle, 24, fixed in the fork, and is provided with the usual bushing, 25, and contacts, 26. Loose on the stem, 20, and within the housing formed by the flange, 13, of the frame is a segmental gear, 27, whose lower face rests on the base plate, 12, and whose body portion extends above the surface of the top plate, 14, through an opening, 28, therein. The upper face of the gear body, 27, forms a seat for the fork, 22, and has two longitudinally disposed V-shaped projections, 29, with intermediate transversely disposed V-shaped depressions, 30, which register respectively in similar shaped but oppositely disposed depressions, 31, and projections, 32, upon the base of the fork. A movement of gear, 27, in either direction serves to either turn or to elevate the forward wheel, 23, and its fork-stem, 20. To prevent excessive vertical movement or the entire disengagement of the stem, a washer, 33, is supported near the lower end thereof by a spring pin, 34. The gear, 27, meshes with a second gear, 35, mounted on a spindle, 36, in the bearing, 19, which gear, in turn, meshes with a mutilated gear, 37, fixedly mounted upon the spindle, 7, by which means any turning movement of the spindle, 7, is communicated to the fork-stem, 20. In the bearing, 18, is a fork-stem, 38, with a projecting lower portion upon which is a washer, 39, supported by a pin, 39'. The upper face of the bearing, 18, forms a seat for the rear fork, and is provided with projections, 40, and depressions, 41, identical in form and relative position with those of gear, 27. Fixed by a pin, 42, to the fork-stem, 38, or integral with the latter, is the fork, 43, in which is mounted, on a pintle, 44, and bushing, 45, the rear trolley wheel, 46. The fork is also provided with the usual contacts, 47. Upon the base of the fork, 43, are projections, 48, and depressions, 49, similar in shape and relative position with those upon the forward fork, and which register respectively with the depressions, 41, and projections, 40, of the bearing, 18.

The operation of my device will be described in connection with a switch, 52, main conductor, 53, and branch wires or conductors, 54, and is as follows: In passing on a straight course, the relation of the parts are, as already detailed. In passing a curve, however, trolley wheels, 23 and 46, as shown in Figs. 6 and 7, are at an angle to each other, because of the turning of their fork-stems; and the suspension frame, which is shown in broken outline, is in a different vertical plane from the trolley pole, 1. In other words, the pole takes the position of the car, while the frame takes the position of the conductor. In turning, the suspension frame 11, both wheel forks, 22 and 43, all rise in their angular seats under the torsional strain, but resume by force of gravity their normal positions after the curve is passed.

The positions assumed by the parts in passing a switch are progressively shown in Figs. 8 to 12 inclusive. Figs. 8 and 9 show the forward trolley wheel upon the switch, 52. Fig. 12 is a perspective view of my device when in the position indicated in Fig. 9. It will be noted that when my device is in the position indicated in Figs. 9 and 12, the wheels, 22 and 46, are at an angle to each other, but the forward fork, 22, and suspension frame, 11, rest in their angular seats because they are under no torsional strain. Reference to Fig. 9 shows that the forward wheel, 23, is positioned adjacent the smooth intermediate portion of the switch, and is free of torsion. Therefore, the angular seat of its fork retains the wheel, 23, in alinement with the frame, 11, which at that instant is in alinement with the pole, 1. The wheel, 46, being still in engagement with the conductor, 53, at this moment and at vertical angle differing from that of the suspension frame is under a torsional strain which elevates the stem, 38, to compensate for the temporary tilt of the frame, 11, when the forward wheel is in the free space. When the wheel, 46, has passed the conductor its fork stem descends by gravity; the fork base is longitudinally retained in its seat, 40; and the wheel assumes the position shown in Fig. 10.

As described, the rear wheel is under all circumstances in guarding contact with the overhead conductors. The same is true of the forward wheel, 23, but the latter has additional functions. Namely, it must be so mounted, that when it passes the free space of a switch it will be positively forced into the direction taken by the pole. In other words, the wheel, 23, must normally lie in the same vertical plane with the pole, or parallel thereto, in all its turnings. This result is attained through the spindle, 7, which is turned by the arms, 3, of the pole, 1, and through the connected gears, 37, 35, and 27, and the fork, 22. The wheel, 23, however, must not be rigid, because under certain conditions the wheel is not free to follow the angular impulse of the pole. An example of this is shown in Fig. 11, in which case the car is supposed to have passed the track switch and the trolley device is about to enter upon the switch, 52, upon the conductor, 53, the pole being angularly directed toward the observer. The frame, 11, remains parallel with the conductor, 53, despite the torsional influence of the arms, 3, and rises on its seat 10; and the conductor, 53, restrains the wheel, 23, from turning into a plane even parallel with that of the pole, since the retaining force of the conductor exceeds the torsional force of the gear, 27, and the fork, 22 is capable of the necessary rotation in its angular seat. The gear mechanism exclusively governs the forward wheel only when the latter is in the free space of the switch.

To prevent excessive rotation of the frame, 11, when the device is temporarily removed from the conductor, 53, I provide a suitable stop. The preferred form is that shown in the drawings. A projection or shoulder, 55, upon the end of sleeve, 6, registers in an arc shaped slot or recess, 56, in the fork bearings 4.

Since the suspension carriage is pivoted upon the pintle, 5, the former is always substantially horizontal to the conductor regardless of the position of the pole, even when the pole is in the position shown by broken lines in Fig. 3, occasioned by the car passing under a bridge.

It will be noted that under no conditions can the wheels become accidentally disengaged from the conductor wire, and all auxiliary guarding and retaining devices are dispensed with.

What I claim is,

1. The combination with a trolley pole, of a plurality of independent vertical stems and a plurality of independent gravitating trolley wheels supported on said stems and mounted for vertical movement under torsional strain tending to preserve the wheels in alinement.

2. The combination with a trolley pole and a fork, of a suspended spindle disposed in the fork thereof, a suspension frame carried by said spindle, a plurality of independent vertical stems and a plurality of independent trolley wheels on said vertical stems in said frame as mounted to rise under torsional strain and to fall to their normal positions by gravity.

3. The combination with a trolley pole and a fork, of a suspension frame suspended from the fork thereof, a depending spindle supporting said frame and a plurality of independent trolley wheels mounted upon vertical supports in said frame.

4. The combination with a trolley pole and a fork, of a suspension frame suspended from the fork thereof, a depending spindle, vertical supports in said frame and a plurality of independent trolley wheels mounted upon said vertical supports, said frame being mounted for movement to take the position of a conductor while the pole takes the position of a car while passing a curve.

5. The combination with a trolley pole, of a pintle, a depending spindle pivotally supported thereby, a frame carried by the spindle, and a plurality of trolley wheels mounted on vertical axes in said frame for vertical movement.

6. The combination with a trolley pole, of a pintle, a depending spindle pivotally supported thereby, a frame carried by the spindle, a plurality of trolley wheels mounted on vertical axes in said frame for vertical movement, and means on said spindle for rotating one of said wheels about a vertical axis.

7. The combination with a trolley pole, of a suspended rotatable frame, a plurality of trolley wheels carried thereby, and means to prevent excessive rotation of said frame.

8. The combination with a trolley pole, of a pintle, a depending spindle pivotally supported thereby, a frame carried by the spindle, a plurality of trolley wheels mounted on vertical axes in said frame for vertical movement, and means on said spindle for rotating one of said wheels about a vertical axis, said frame being pivotally suspended to always maintain a substantially horizontal position relatively to a conductor regardless of the position of the pole.

9. The combination with a trolley-fork and pintle, of a depending spindle pivotally supported by the pintle, a frame pivotally mounted upon the spindle, and trolley-wheels mounted in the frame.

10. The combination with a trolley-fork and pintle, of supporting means for the trolley-wheels pivotally suspended from the pintle and adapted to swing transversely to the fork, means for raising the supporting means as the latter moves towards the limit of its transverse travel, and trolley-wheels mounted in the frame.

11. The combination with a trolley-pole, of a pintle, a depending spindle pivotally supported thereby, a frame carried by the spindle, a plurality of trolley wheels mounted on vertical axes in said frame for vertical movement, means on said spindle for rotating one of said wheels about a vertical axis, said frame being pivotally suspended to always maintain a substantially horizontal position relatively to a conductor regardless of the position of the pole, and means to prevent excessive rotation of said frame.

12. The combination with a trolley pole and a pivoted suspended trolley frame, of a vertical bearing in the frame, an angular seat in the upper face of the bearing, a vertically disposed rotatable trolley-fork stem loosely mounted in the bearing, a trolley-fork upon the stem, and an angular projection upon the fork adapted to rest in the angular seat.

13. The combination with a trolley pole, fork, and pintle, of a depending spindle pivotally supported by the pintle, a frame pivotally mounted on the spindle, two trolley wheels rotatably mounted in the frame, and means fixed to the spindle adapted to actuate one of the rotatable wheels.

14. The combination with a trolley-pole, fork, and pintle of a depending spindle pivotally supported upon the pintle, a frame pivotally mounted on the spindle, a fork stem loosely mounted in each end of the frame, a gear loose on one stem and provided with an angular seat on its upper face, an angular seat adjacent the other stem, a gear fixed on the spindle operatively with the first gear, trolley-wheel forks upon the stems resting in the seats, and trolley wheels mounted in the trolley-wheel forks.

15. The combination with a trolley pole, trolley-fork, and pintle, of a frame suspended from the pintle and adapted to swing transversely, a plurality of trolley wheels independently rotatably mounted in said frame and means for normally retaining the frame against transverse movement.

16. The combination with a pivotally suspended rotatable trolley-frame, of a trolley-wheel fork pivotally mounted on the frame, and gravitating means upon the fork coacting with the frame for normally retaining the trolley-wheel fork in fixed position.

17. The combination with a pivotally suspended rotatable trolley-frame and two trolley-wheels mounted thereon, of means in the frame for elevating one trolley wheel independently of the other.

18. The combination with a pivotally suspended rotatable trolley-frame and two trolley-wheels loosely mounted thereon, of means in the frame for rotating one wheel independently of the other.

19. The combination with a trolley pole and a horizontal pintle, of a spindle suspended therefrom, a rotatable frame suspended from said pintle and mounted for vertical movement, and a plurality of trolley wheels mounted on independent vertical stems in said frame.

20. The combination with a trolley pole and a horizontal pintle, of a spindle suspended therefrom, a rotatable frame suspended from said pintle and mounted for vertical movement, a plurality of trolley wheels mounted on independent vertical stems in said frame, and means to prevent excessive rotation of said frame.

21. The combination with a trolley pole and a horizontal pintle, of a spindle suspended therefrom, a rotatable frame suspended from said pintle and mounted for vertical movement, a plurality of trolley wheels mounted on independent vertical stems in said frame, and gearing connecting the spindle of said frame with the stem of one of said trolley wheels.

22. The combination with a trolley pole and a horizontal pintle, of a spindle suspended therefrom, a rotatable frame suspended from said pintle and mounted for vertical movement, a plurality of trolley wheels mounted on independent vertical stems in said frame, gearing connecting the spindle of said frame with the stem of one of said trolley wheels, and means for preventing excessive rotation of said frame.

23. The combination with a trolley pole and a horizontal pintle, of a spindle suspended therefrom, a rotatable frame suspended from said pintle and mounted for vertical movement, a plurality of trolley wheels mounted on independent vertical stems in said frame, gearing connecting the spindle of said frame with the stem of one of said trolley wheels, and means for preventing excessive rotation on said frame, said stem being vertically movable, and means to prevent excessive vertical movement thereof.

24. The combination with a trolley pole, of a plurality of rotatably suspended vertical stems mounted for independent vertical movement and a plurality of independent gravitating trolley wheels supported on said stems and mounted for vertical movement under torsional strain.

In testimony whereof I have affixed my signature in presence of two witnesses.

CHARLES HARKNESS.

Witnesses:
HORATIO E. BELLOWS,
WATLER E. GOODWIN.